Figure 1:
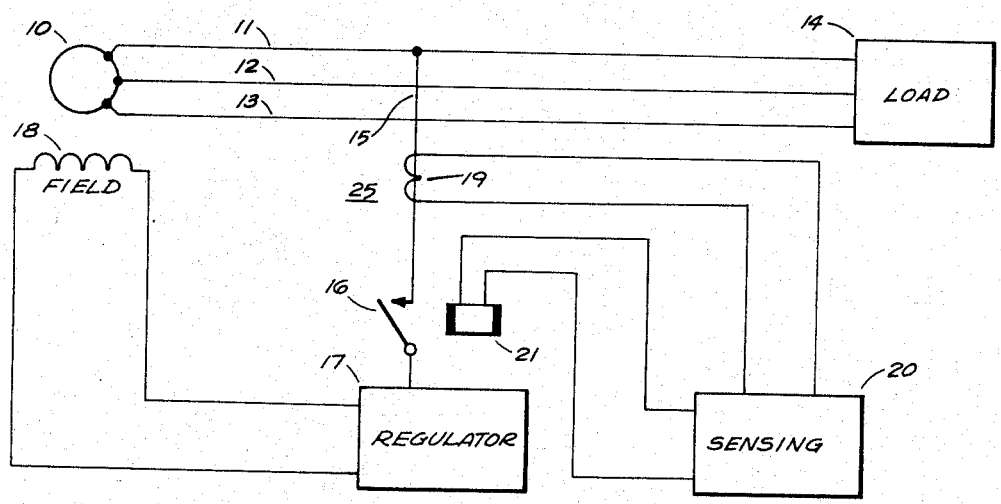

Nov. 7, 1967  J. H. CUTLER ET AL  3,351,812
GENERATOR PROTECTIVE SYSTEMS
Filed Nov. 15, 1963

INVENTOR.
JOHN H. CUTLER AND
WILLIAM A. LeDOUX
BY Robert P. Strack
THEIR ATTORNEY

United States Patent Office 3,351,812
Patented Nov. 7, 1967

---

3,351,812
GENERATOR PROTECTIVE SYSTEMS
John H. Cutler and William A. Le Doux, Waynesboro, Va., assignors to General Electric Company, a corporation of New York
Filed Nov. 15, 1963, Ser. No. 323,992
8 Claims. (Cl. 317—13)

This invention relates to generator protective systems and more particularly, to means for modifying the excitation of the generator in the event of either excessive regulator current, excessive generator output voltage, or insufficient generator output frequency.

Equipment designers in the power generation field are constantly striving to meet requirements of higher efficiency, greater dependability, lighter weight, and fewer components. These requirements are particularly evident in the aircraft industry wherein equipment reliability affects passenger safety and equipment size directly affects cargo or passenger handling capabilities. Generators on aircraft must provide well regulated outputs as a suitable power source for complex electronic equipment. Also, in order to avoid failures which can have catastrophic effects, means must be provided for the protection of both the generator and regulating equipment in order to detect and take remedial action in the event of conditions which could cause damage.

A general object of the present invention is to provide improved means for protecting generators and their regulating equipment.

The use of jet propulsion has illuminated the function of generator regulation from a new aspect. Whereas, in the past, the removal of power from conventional prime movers resulted in short duration braking and relatively rapid generator deceleration, the cut-off of jet engine prime movers results in a slow braking and gradual generator deceleration. The effects of such gradual deceleration upon the generator and regulating equipment are notable.

Power regulation circuits are generally coupled to the output of a generator and adapted to monitor particular output characteristics such as voltage, current, and frequency. In accordance with the nature of these characteristics, the energization of the generator field is modified to establish a desired condition. Thus, if a drop in generator voltage is detected, an error signal is developed by the regulator that controls circuitry for increasing the field current of the generator to increase the field strength and bring the output voltage back to the desired value.

When a jet engine or similar slow braking drive means is employed, following engine cut-off, the coupled generators coast to a stop over a considerable period. During this coasting period, experience has shown that the decreasing voltage and frequency of the slowing generator causes the regulator to operate at a peak output and establish a maximum field current in order to compensate for the changing generator output. Obviously, this is to no avail because the equipment will ultimately come to a complete stop and cease generating entirely. To avoid burning out the regulation equipment and the generator field during such prolonged high current periods, regulators and generator fields must be designed to handle considerably greater power than is actually required during the major portion of the duty cycle. This is both inefficient and space consuming. The present invention provides means for sensing the regulation circuit input in order to detect such prolonged high current conditions and modify the regulator operation. This permits the use of lighter and more economical regulators designed to accommodate the normal operating conditions rather than the abnormal conditions.

Another object of the present invention is to provide means operative in response to particular regulator input conditions to protect the regulation circuitry by modifying its operation.

An indication of generator output voltage and frequency is also present in the characteristics of the input to a regulating circuit. It will be appreciated that the generator's field current, as determined by the regulator, is a function of both the generator terminal voltage and line load. Accordingly, in the event of overvoltage conditions caused by a faulted or improperly adjusted circuit, a higher than normal regulator line current will occur. A similar condition occurs in response to a reduction in generator frequency due to the magnetic saturation of the generator, as the rotation of its armature decreases. By selectively considering the characteristics of the input to a regulator, therefore, it is possible to detect damaging generator overvoltage conditions or underfrequency conditions.

Another object of the invention is to provide improved means for protection against equipment damage resulting from either generator overvoltage or underfrequency which extends beyond a preselected time interval.

Still another object of the present invention is to provide a single circuit which performs the three functions of: generator overvoltage protection; generator underfrequency protection; and regulator overcurrent protection.

Briefly, the invention is embodied in a generator protection system comprising means for sensing the amount of current supplied as an input to regulation circuitry. A qualitative determination of the effect of this current upon the regulation circuitry and the generator field is thereupon made and when the amount of current so applied exceeds a predetermined amount, the input to the regulation circuitry is disconnected from the generator output or other source of field supply.

Figure 2:
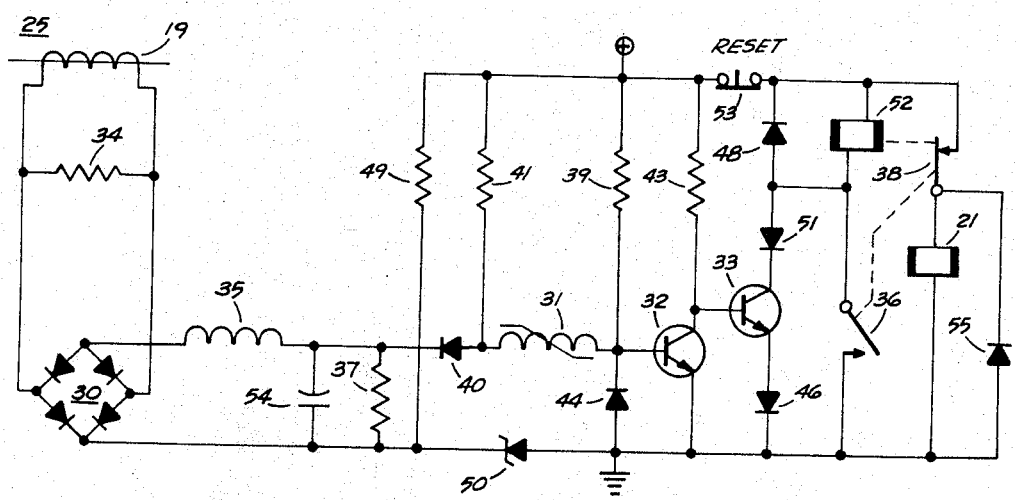

The novel features of the invention are set forth with particularity in the appended claims. The invention itself, however, both as to its organization and method of operation, together with further objects and features thereof, may best be understood by reference to the following description taken in conjunction with the accompanying drawing wherein:

FIGURE 1 is a block diagram schematic illustrating the interrelationship of the major components of the present invention; and FIGURE 2 is a circuit schematic of a particular sensing circuit suitable for use with the invention.

For purposes of illustration, the invention is shown in FIGURE 1 as embodied in a three-phase alternating current system wherein a generator 10 supplies power to a load 14 over conductors 11, 12, and 13. It should also be appreciated that although a three phase circuit is shown, the invention is in no way restricted to polyphase systems. A regulator 17 is shown connected to output conductor 11 via a lead 15 and normally closed contacts 16. Regulator 17 may advantageously be coupled to one or more phases of the generator output either directly and/or by the use of transforming devices. The regulator 17 is operative to control the energization of generator field 18 in accordance with the characteristics of the output, whereby the field is strengthened or weakened to establish a desired output. The particular type of regulator employed is not germane to the invention and it may be of any suitable form known in the art. It is contemplated in the embodiment that regulator 17 senses three phase average voltage but derives its current for field winding 18 from a single phase. Of course, field current could also be obtained from all three phases.

A sensing circuit 20 is coupled to input lead 15 by means of a current transformer 25. The secondary 19 of transformer 25 is designed to develop a voltage proportional to the current delivered via lead 15 to the regulator.

The function of sensing circuit 20 is to analyze the current passing through lead 15 and generate a servering signal whenever this current is great enough to result in damage to either the regulator or the generator field. Thus, if the amount of current delivered to the regulator is sufficient to either burn out regulator 17 or lead to the excess excitation of field windings 18, an indication is presented by sensing circuit 20. In response to such an indication, a relay 21 is deenergized and, when deenergized, opens contacts 16 to remove the input from regulator 17. Accordingly, in the event of dangerous overcurrents, the input stimulus to regulator 17 is removed and the energization of field 18 stopped.

A particular sensing circuit adapted to perform the functions required of sensing circuit 20 in FIGURE 1 has been schematically illustrated in FIGURE 2.

FIGURE 2 shows a means for deenergizing relay 21 in accordance with the current sensed in secondary winding 19. In general, the circuit includes a rectifying bridge 30 adapted to convert the alternating current in secondary 19 to a direct volage which may be used to control timing and relay triggering circuitry. In accordance with the requirement that high voltage or current conditions must be tolerated for short periods during normal operation, means are provided in the form of a saturable reactor 31 for establishing a variable time delay determined by the amount of current sensed by secondary winding 19. When the current/time sensed by secondary 19 is considered excessive for equipment safety, a pair of transistors 32 and 33 operate to establish an energization path for a relay 52 and this, in turn, causes relay 21 to be deenergized to disconnect the regulator circuit from the output of the generator at contacts 16, as shown in FIGURE 1.

The operation of the circuit in FIGURE 2 may be conveniently described along with a consideration of the particular interacting components connected therein. Transformer secondary 19 has a burden resistor 34 in parallel therewith, as well as the full-wave rectifying bridge 30. The voltage developed across rectifying bridge 30 is applied via a filter comprising inductance 35 and a capacitor 54 to a second resistor 37. The upper terminal of resistor 37, which is connected to the negative output of rectifying bridge 30 via inductance 35, is further connected to the base of transistor 32 by means of a rectifier 40 and saturable reactor 31; rectifier 40 being oriented to conduct from said base to resistor 37. The lower terminal of resistor 37, which is directly connected to the positive output of rectifying bridge 30, is connected to ground via a Zener diode 50. In addition, a resistor 41 connects the anode of rectifier 40 to a positive potential (+) and a resistor 49 connects the cathode of Zener 50 to this same potential.

It will be appreciated that the secondary current in winding 19 is proportional to the primary current. Thus, disregarding the negligible effects of the excitation current and the forward voltage drop in bridge 30 during the forward conduction intervals, the voltage developed across resistor 34, resistor 37, and capacitor 57 is proportional to the primary current. Resistors 34 and 37 comprise the burden across secondary winding 19. The value of resistor 37 is chosen for discharge of capacitor 54 and the parallel impedance of resistors 34 and 37 is selected to furnish a voltage substantially equal to the drop across Zener diode 50 when the primary current is at a level that will cause possible equipment damage. This will be more fully appreciated from the circuit operation.

NPN transistor 32 is a signal amplifier connected to normally function in a conducting state. The specific connections include: a resistor 43 between the collector and a positive potential source, a direct connection between the emitter and ground, and the aforedescribed input connections.

The series circuit of resistor 49 and Zener 50 is arranged to break down Zener 50 and establish a fixed voltage on the cathode thereof. During normal operation, the voltage developed across resistor 37 in response to regulator input current is less than this fixed voltage and, therefore, rectifier 40 is reverse-biased and nonconducting. Under these conditions, reactor 31 is saturated, in what will be called a "reverse" direction, by current flow in the path from the positive source to ground comprising: resistor 41, its own winding, and the base-emitter junction of transistor 32.

Saturable reactor 31 is a voltage driven device. When it is not saturated, a relatively low exciting current flows therein as a result of the voltage applied thereacross. Increasing the driving voltage while such a reactor is unsaturated, does not cause a proportionate increase in current; however, it does reduce the period of time required to cause saturation. Saturation takes place when the product of the voltage applied and the time of application reaches a constant value (i.e. the volts-seconds value) for which the reactor is designed. After saturation, the reactor exhibits a relatively low impedance and may be regarded as equivalent to a closed switch.

When the primary current in transformer 25 is equal to or greater than the level at which it is desired to open the regulator input lead, the magnitude of the voltage developed across resistor 37 is equal to or greater than the voltage appearing at the cathode of Zener diode 50. Accordingly, the cathode of rectifier 40 is rendered more negative than its anode and a current path is furnished for exciting saturable reactor 31 in a "forward" direction. The current path comprises: the positive source, a resistor 39, the windings of reactor 31, rectifier 40, resistor 37, and Zener diode 50. If the current in this path continues for a duration adequate to attain the volts-seconds magnitude of reactor 31, the reactor saturates in the forward direction. Under this condition, the base of transistor 32 is driven negative with respect to its emitter and transistor 32 is rendered nonconducting. As will now be described, "turn-off" of transistor 32 initiates the circuit operation that results in disconnection of the regulator input. Because saturable reactor 31 is used, it will be appreciated that the turn-off of transistor 32 can be achieved both by a high amplitude short duration current condition, or a lower amplitude longer duration current condition.

A current amplifier comprising NPN transistor 33 is connected with its collector-emitter junction in series with relay 52 and rectifiers 51 and 46 between a positive voltage source and ground; rectifier 51 being interposed between the relay and the collector electrode and rectifier, 46 being interposed between the emitter electrode and ground. The base of transistor 33 is directly connected to the collector of transistor 32 and the biasing voltages resulting from the described connections and components are appropriately adjusted to insure nonconduction of transistor 33 except during those times that transistor 32 is nonconductive. Accordingly, the only time relay 52 is energized is when transistor 33 is rendered conductive in response to the turn-off of transistor 32. This latter condition exists only when the aforedescribed predetermined amount of current is detected by secondary winding 19.

Upon turn-off of transistor 32, the voltage on its collector rises until transistor 33 becomes forward-biased and assumes a conducting state. This creates an energization circuit for relay 52. Upon energization, relay 52 creates a holding path by closing its contacts 36 and causes deenergization of relay 21 by opening its contacts 38. Contacts 36 shunt the series circuit of rectifier 51, transistor 33, and rectifier 46. Contacts 38 are serially connected with relay 21 across the supply. Deenergization of relay 21 causes disconnection of the regulator circuitry. It is within the discretion of the equipment designer whether to remove all field energization upon disconnection of the regulator or to merely substitute some predetermined energizing current.

It will be appreciated that sensing relay 52 is smaller than relay 21 which must handle a considerable amount of current at its contacts 16 shown in FIGURE 1. It is considered good practice to normally energize the control relay 21 to maintain the regulator line closed, because with this approach, loss of power to the relay will not result in a condition where line 15 could not be opened. With the described connections, once the protection circuitry has tripped due to generator overvoltage, generator underfrequency, or regulator overcurrent, it will remain tripped. As shown in FIGURE 2, reset is manually accomplished by removing power from relay 52 at switch 53. Switch 53 is effective to either deenergize relay 21 under normal conditions, or deenergize relay 52 under abnormal conditions.

In recapitulation, it will be seen that by means of a single sensing circuit, a generator may be protected from damage resulting from either overvoltage or underfrequency and, at the same time, a regulator of efficient design may be protected from damage as a result of overcurrent. Although the particular elements used to accomplish these objectives have been specifically set forth in an illustrative embodiment, it will, of course, be understood that it is not wished to be limited to such specific circuit elements since modifications can be made both in the elements and the circuit arrangement and it is contemplated in the appended claims to cover any such modifications as fall within the true spirit and scope of the invention.

What is claimed as new and desired to be secured by Letters Patent of the United States is:

1. In a protection system for a generator having a field energized under the control of a regulator, normally conducting switching means connecting the input of said regulator to the output of said generator, and means coupled to said switching means and responsive to detection of current being supplied to said regulator in excess of a predetermined amount to render said switching means nonconductive.

2. In a protection system for a generator having a field energized with current controlled by a regulator, current supply leads, normally conducting switching means serially supplying current via said supply leads to the input of said regulator, and means coupled to said supply leads and responsive to detection of supplied current in excess of a predetermined amount developed in said supply leads to render said switching means nonconductive.

3. In a protection system for a generator having a field energized under the control of a regulator, connecting means including normally conducting switching means for supplying current to the input of said regulator from the output of said generator, said regulator being operative to effect energization of said field by an amount commensurate with the amount by which said generator output differs from a predetermined value, and means coupled to said connecting means and responsive to the current supplied through said connecting means exceeding a predetermined value to render said switching means nonconductive.

4. In an alternating current generator protective system, a regulator operative in response to the characteristics of the output of said generator to energize the field thereof by an amount commensurate with the deviation of said characteristics from a prescribed criterion, current supply leads, connecting means including normally conducting switching means for supplying current via said supply leads to the input of said regulator, and means coupled to said supply leads and responsive to detection of supplied current of a given amount developed in said supply leads to render said switching means nonconductive.

5. In a generator protective system, a regulator operative in response to the characteristics of the output of said generator to energize the field thereof by an amount commensurate with the deviation of said characteristics from a prescribed criterion, a source of field current, connecting means including normally conducting switching means connecting said source of field current via said regulator to said field, sensing means coupled to said connecting means and operative to detect when the current to said connecting means exceeds a predetermined amount, and means controlled by said sensing means to render said switching means nonconductive when said current exceeds a predetermined amount for a predetermined period.

6. In a generator protective system, a regulator operative in response to the characteristics of the output of said generator to energize the field thereof by an amount commensurate with the deviation of said characteristics from a prescribed criterion, a source of field current, connecting means including normally conducting switching means for supplying current from said source via said regulator to said field, current sensing means responsive to the current flow into said connecting means and operative to supply a control current proportional to the current flow in said connecting means, and control means connected to said current sensing means and operative at a time determined by the magnitude of said supplied current to render said switching means nonconductive.

7. A generator protection system as defined in claim 6 wherein said control means comprises, a saturable reactor connected to said current sensing means and adjusted to saturate when the product of the magnitude of said supplied current and the duration of its presence exceeds a predetermined amount, and means operative upon saturation of said saturable reactor to render said switching means nonconducting.

8. In a generator protective system, a regulator operative in response to the characteristics of the output of said generator to energize the field thereof by an amount commensurate with the deviation of said characteristics from a prescribed criterion, a normally energized relay having at least one pair of closed contacts, a source of field current, connecting means including said closed relay contacts connecting said source of field current via said regulator to said field, current sensing means coupled to said connecting means and operative to supply current proportional to the current therein, a saturable reactor connected to said current sensing means and adjusted to saturate when the product of the magnitude of said supplied current and the duration of its presence exceeds a predetermined amount, and transistor means connected to said saturable reactor and operative to deenergize said relay upon saturation thereof and open said contacts.

References Cited

UNITED STATES PATENTS

| | | | |
|---|---|---|---|
| 3,032,701 | 5/1962 | Krausz | 317—13 X |
| 3,177,402 | 4/1965 | Muchnick et al. | 317—33 |
| 3,210,645 | 10/1965 | Domann | 322—28 |

MILTON O. HIRSHFIELD, *Primary Examiner.*

J. D. TRAMMEL, *Assistant Examiner.*